United States Patent
Kose et al.

(10) Patent No.: US 6,586,060 B2
(45) Date of Patent: *Jul. 1, 2003

(54) THIN-WALLED SYNTHETIC RESIN LAMINATED BODY FOR LIQUID CONTAINER AND METHOD FOR MANUFACTURING THE SAME

(75) Inventors: Sadatoshi Kose, Tokyo (JP); Kazunori Hashimoto, Tokyo (JP); Shinji Shimada, Tokyo (JP)

(73) Assignee: Yoshino Kogyosho Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 4 days.

(21) Appl. No.: 09/331,957
(22) PCT Filed: Oct. 30, 1998
(86) PCT No.: PCT/JP98/04942
§ 371 (c)(1),
(2), (4) Date: Sep. 22, 1999
(87) PCT Pub. No.: WO99/22996
PCT Pub. Date: May 14, 1999

(65) Prior Publication Data
US 2002/0132069 A1 Sep. 19, 2002

(30) Foreign Application Priority Data
Oct. 30, 1997 (JP) .............................................. 9/316443
Oct. 31, 1997 (JP) .............................................. 9/316418

(51) Int. Cl.⁷ ........................... B65D 30/10; B65D 8/18; B32B 31/02
(52) U.S. Cl. ........................ 428/35.2; 428/35.7; 383/32; 383/107; 383/108; 206/484; 220/4.24; 156/272.2; 156/275.3; 53/469
(58) Field of Search .............................. 428/35.2, 35.7; 206/438, 484, 277, 820; 383/105, 107, 108, 32; 220/4.23, 4.24, 666; 215/379; 222/107; 53/469; 156/272.2, 275.3

(56) References Cited

U.S. PATENT DOCUMENTS 3,354,924 A * 11/1967 Birrell et al. ................ 220/666
3,643,650 A * 2/1972 Elder .......................... 206/569

(List continued on next page.)

FOREIGN PATENT DOCUMENTS

FR  1327377 A    4/1963
JP  3-289464  * 12/1991

(List continued on next page.)

OTHER PUBLICATIONS

English–language translation of JP–A–8–48363.

(List continued on next page.)

Primary Examiner—Rena Dye
(74) Attorney, Agent, or Firm—Oliff & Berridge, PLC

(57) ABSTRACT

A thin-walled laminated synthetic resin body for a liquid container according to the invention comprises first and second thin-walled synthetic resin layers (10, 20), each having a curved surface portion (11, 21) and a projection (12, 22) extending outwardly from a predetermined region at an edge of the curved surface portion (11, 21). The first and second layers (10, 20) are laminated to each other with the curved surface portions (11, 21) bulging out in the same direction, are integrated with each other at the edges (13, 23) of the curved surface portions (11, 21) and projections (12, 22), and are separable from each other at regions exclusive of the edges (13, 23). When a liquid is charged, the curved surface portion (21) of one of the first and second layers (20) is separated from the curved surface portion (11) of the other layer (10) and reversed. By this, the curved surface portions bulge out in the opposite directions to define an inner space between the curved surface portions (11, 21) for containing a liquid. The laminated body has a high freedom degree of design of the container shape, can be readily formed into desired three-dimensional shape depending upon various applications, and can be manufactured simply and at low cost with conventional production system.

17 Claims, 18 Drawing Sheets

U.S. PATENT DOCUMENTS

| | | | | |
|---|---|---|---|---|
| 3,862,684 A | * | 1/1975 | Schmitt | 206/277 |
| 4,467,588 A | * | 8/1984 | Carveth | 53/425 |
| 5,535,885 A | * | 7/1996 | Daniel et al. | 206/484 |
| 5,609,899 A | * | 3/1997 | Spector | 222/107 |
| 5,638,995 A | * | 6/1997 | Mazda | 222/215 |

FOREIGN PATENT DOCUMENTS

| | | |
|---|---|---|
| JP | A-7-132941 | 5/1995 |
| JP | A-8-48364 | 2/1996 |
| JP | A-8-503426 | 4/1996 |
| JP | A-9-207942 | 8/1997 |

OTHER PUBLICATIONS

Information regarding CUBITAINER® including http://www.hedwin.com/products/cp_cubitainercp/cp_compare.htm visited Mar. 13, 2002.

Information regarding CUBITAINER® including http://www.emergencyresources.com/er_p16.html visited Mar. 13, 2002.

* cited by examiner

FIG. 5
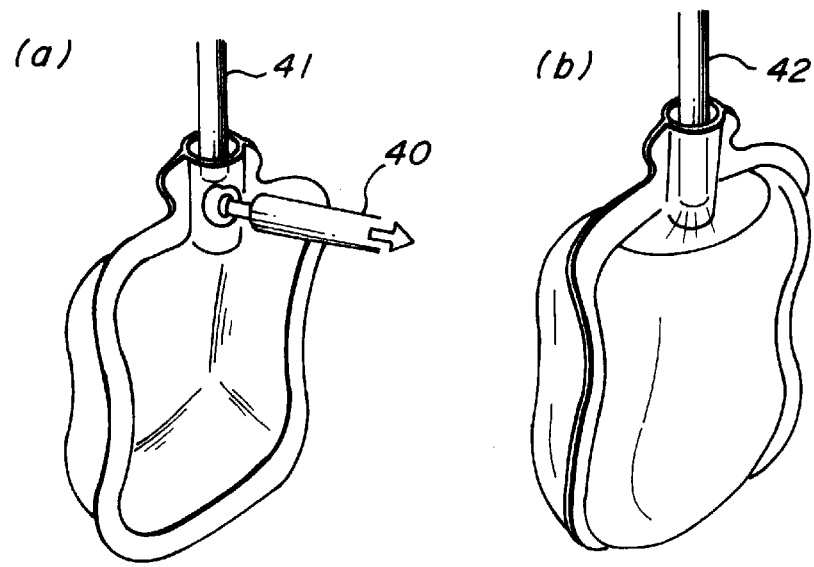
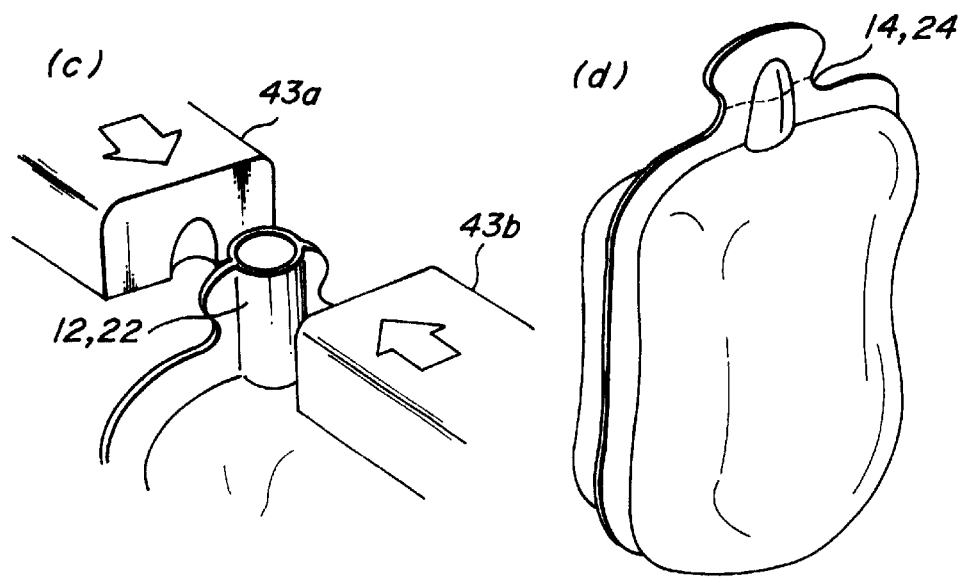
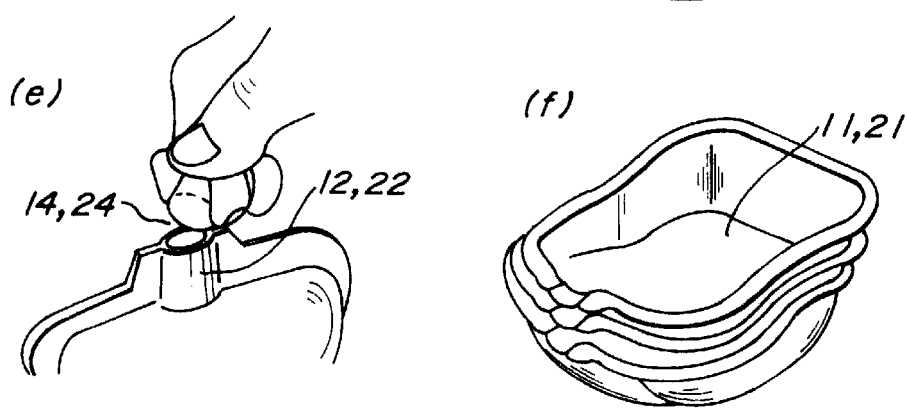

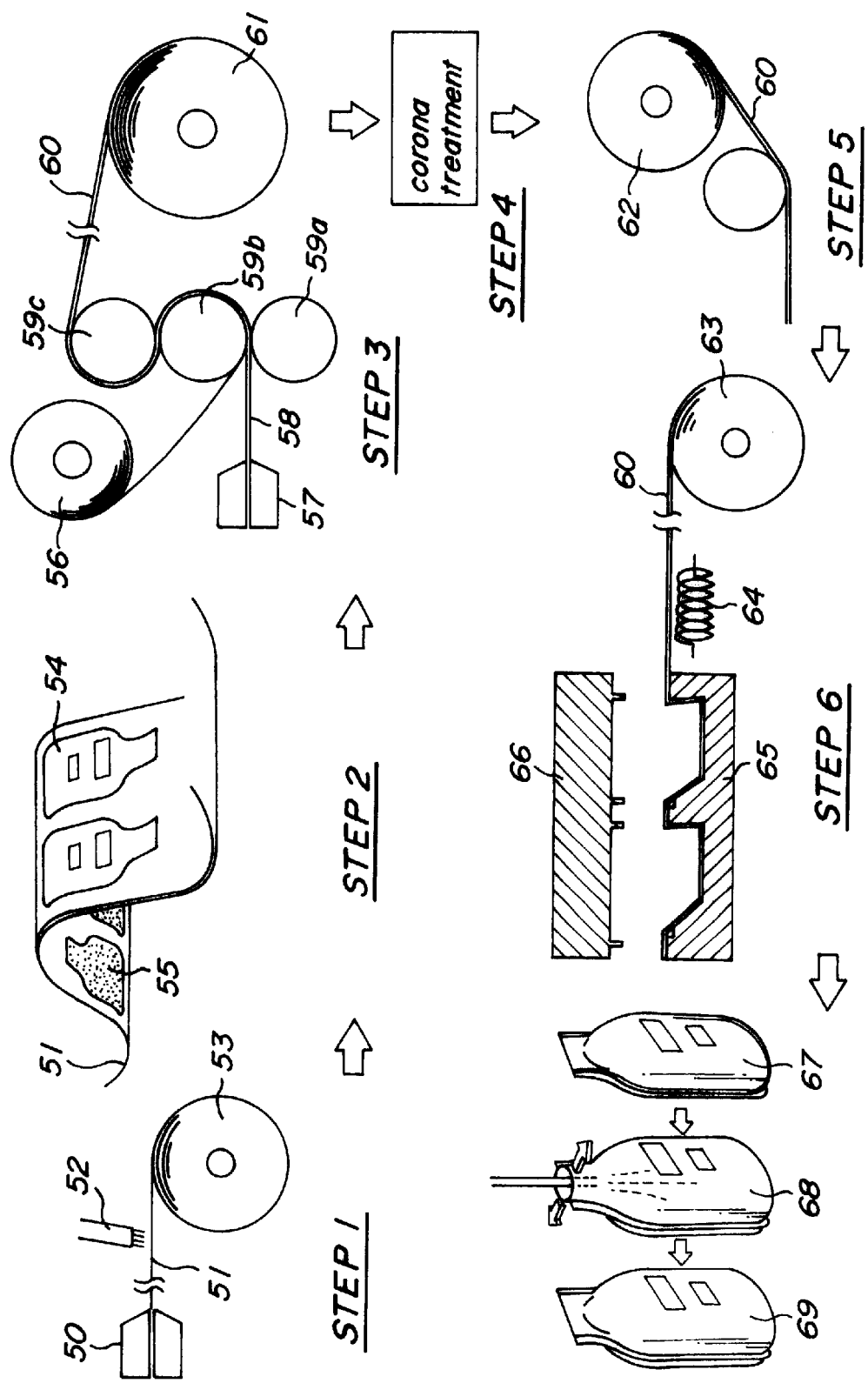

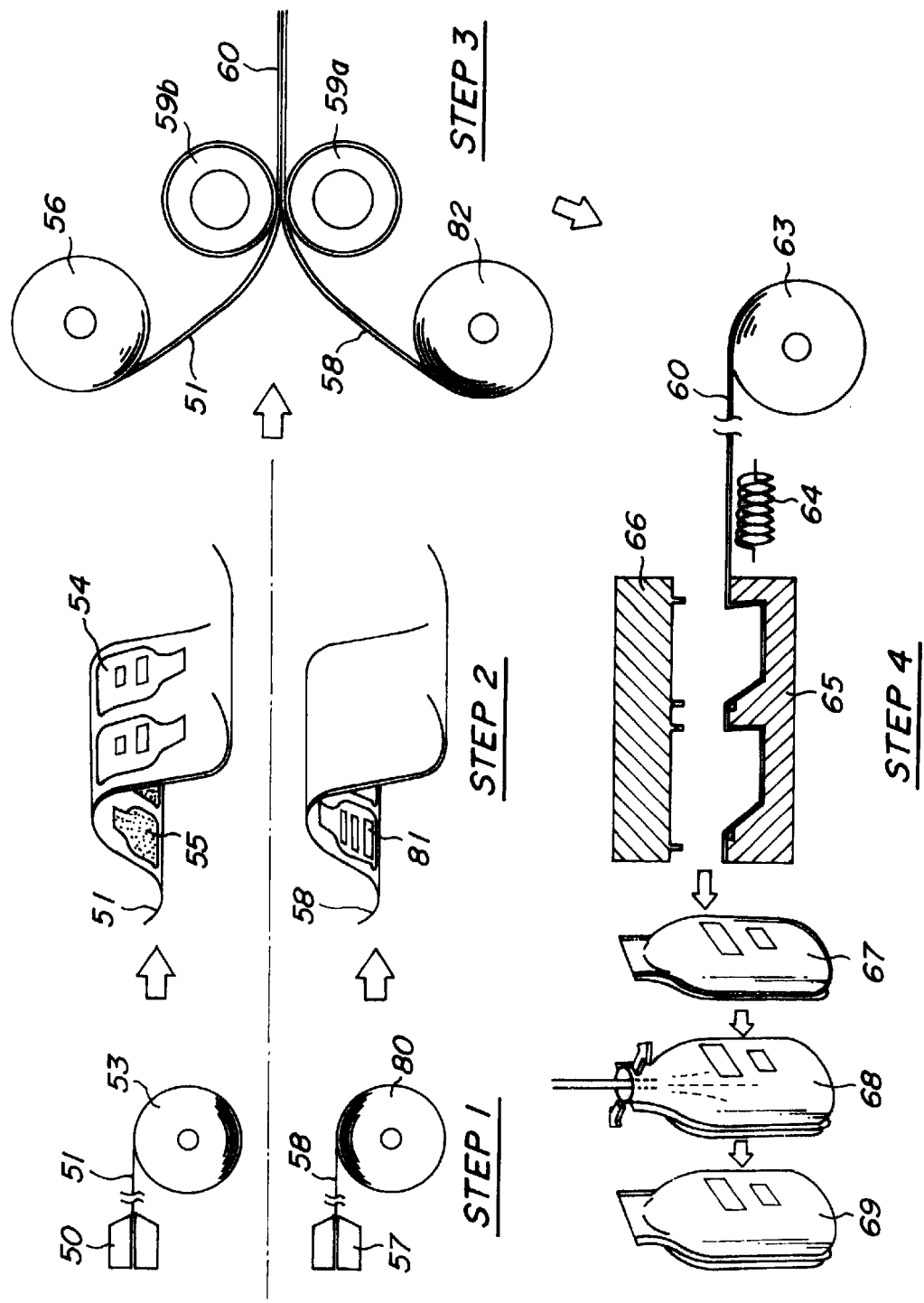

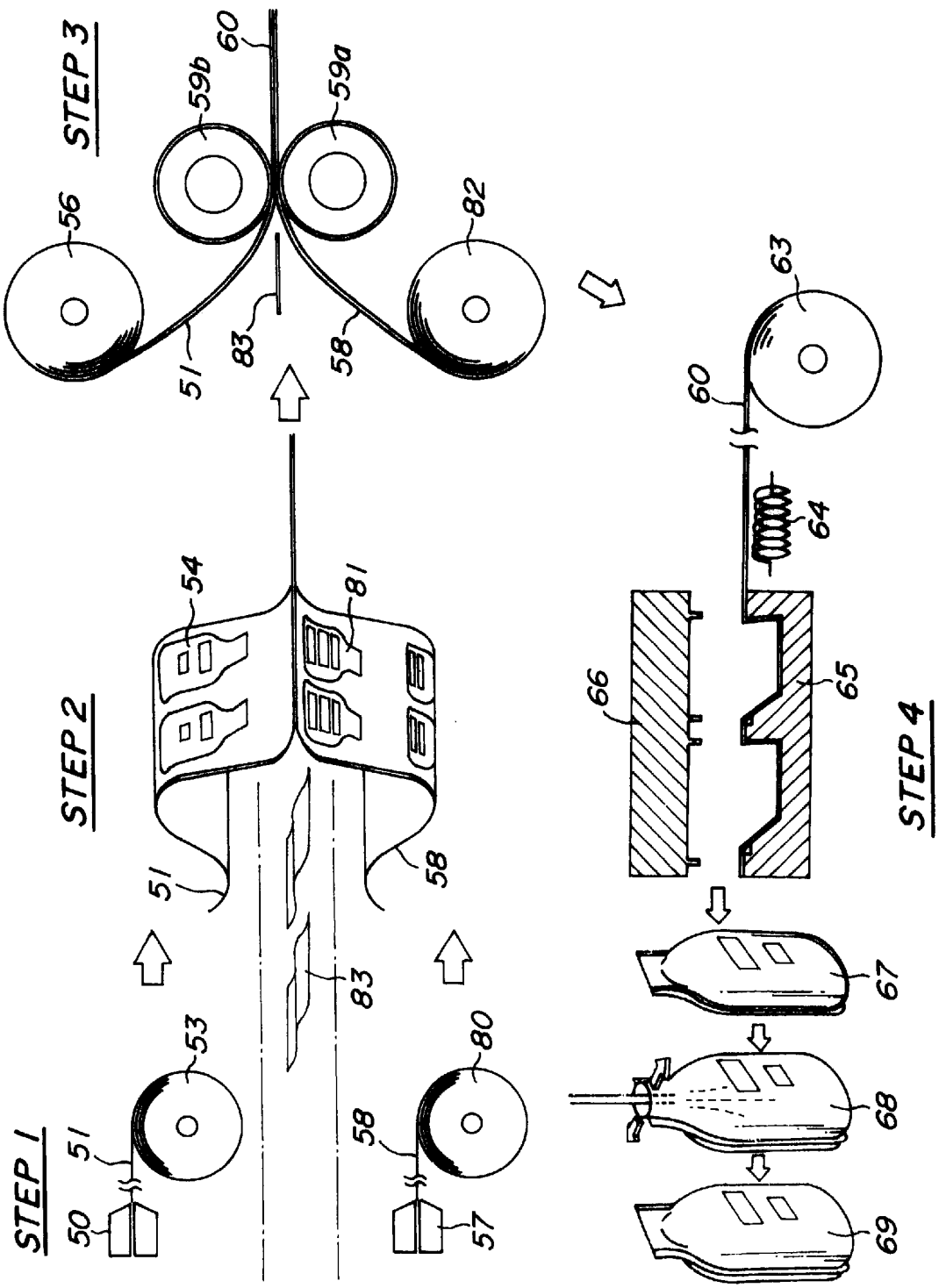

FIG_10
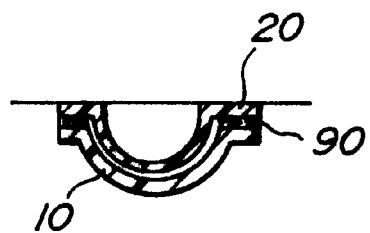
FIG_9
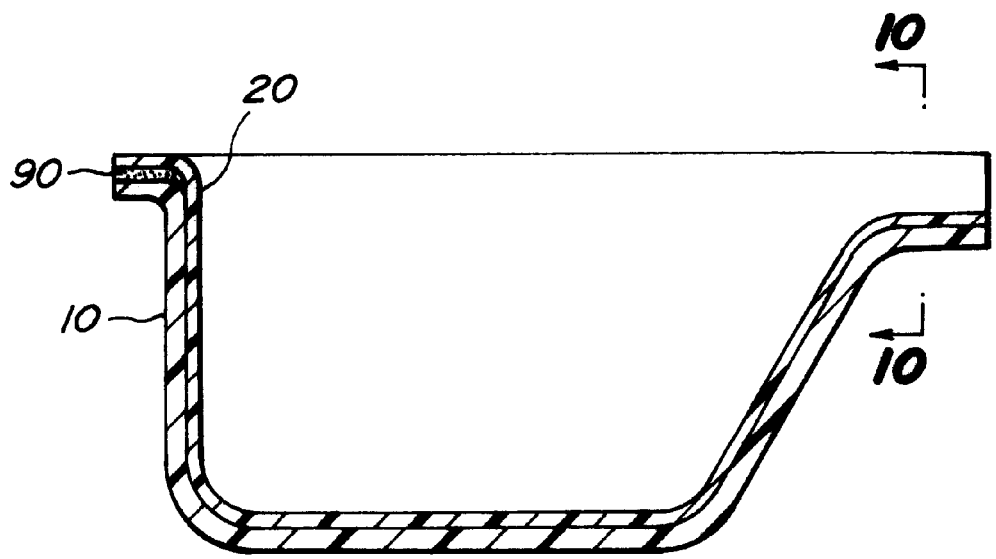

FIG_12
(a)
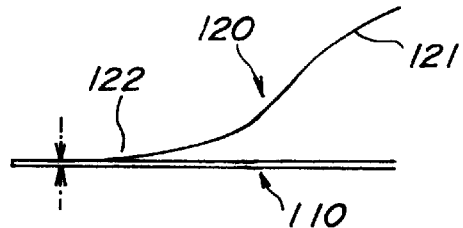
(b)
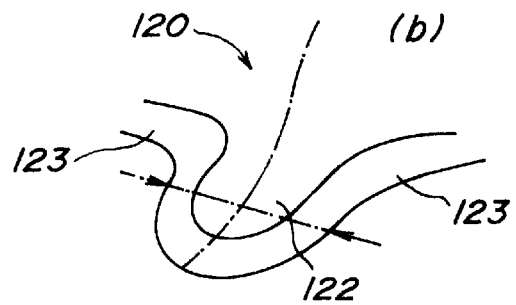
FIG_13
(a)
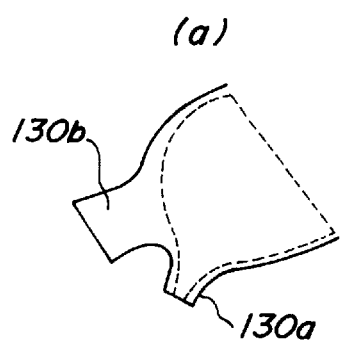
(b)
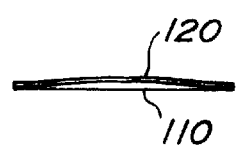
FIG_14
(a)
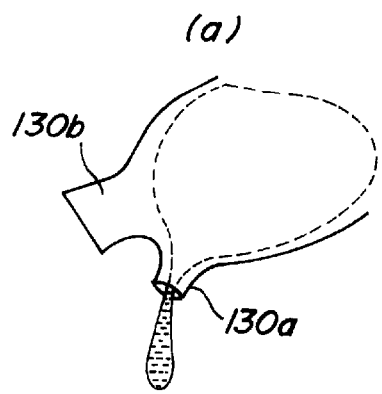
(b)
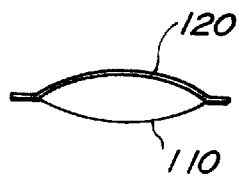

FIG_15
(a)
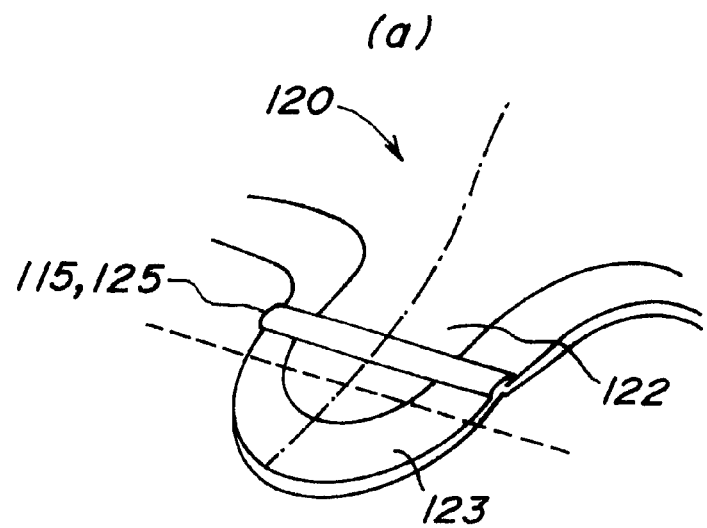
(b)
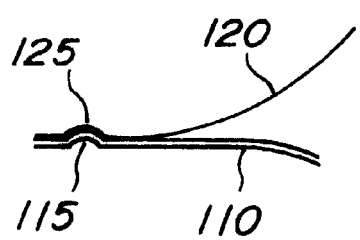
(c)
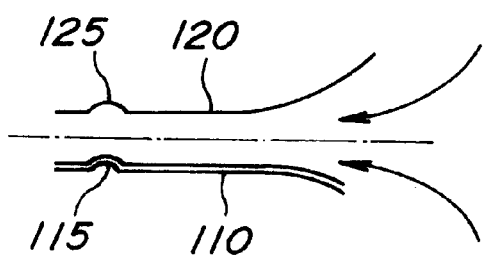

FIG_17
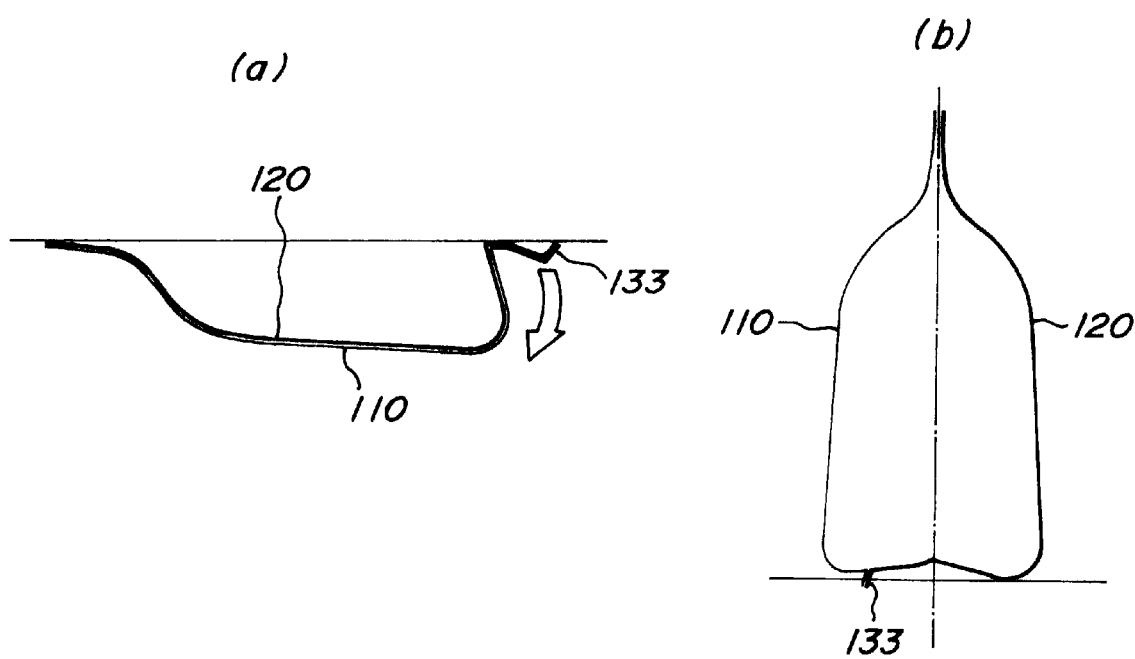
FIG_18
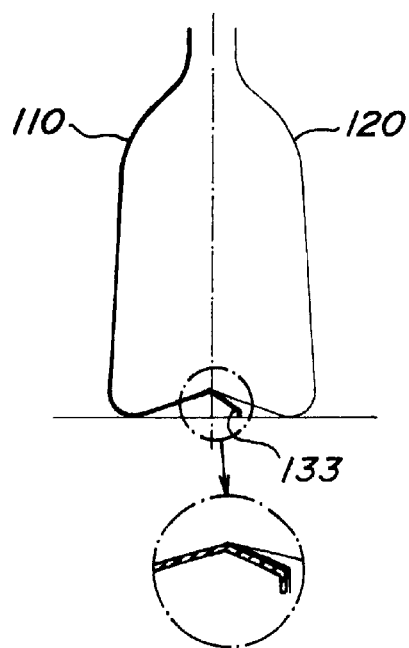

FIG_19
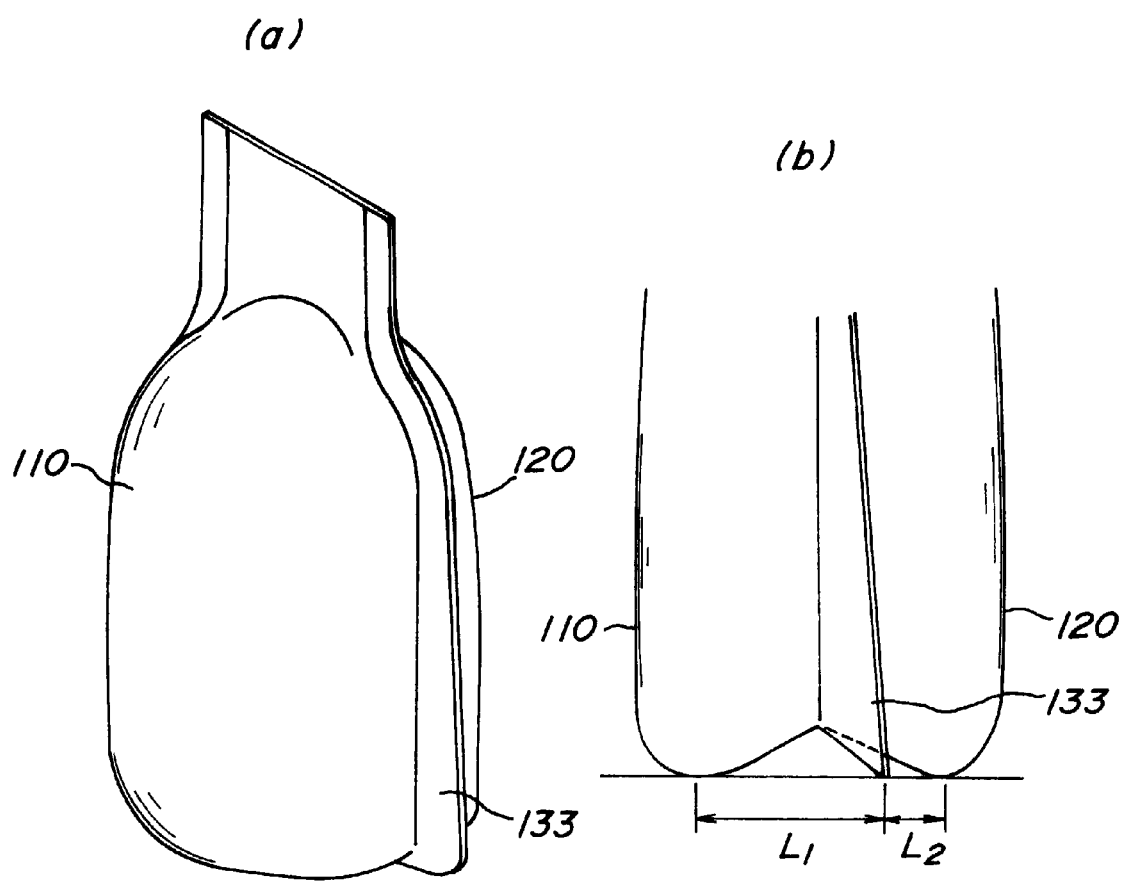

FIG. 20
(a)
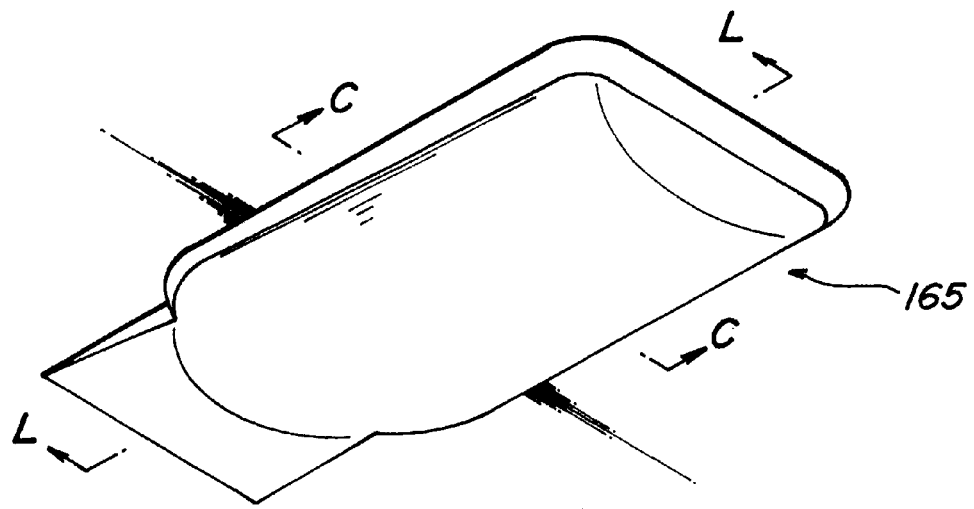
(b)
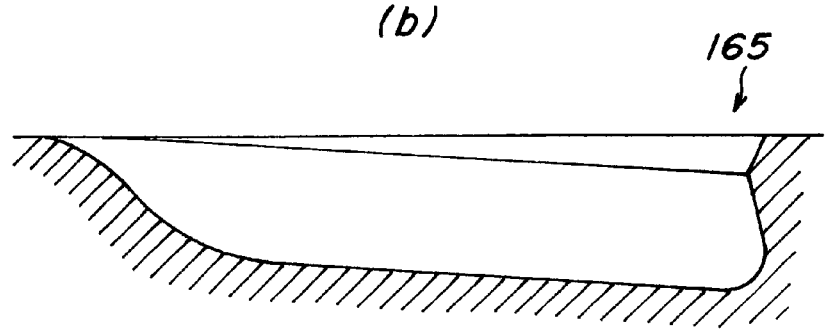
(c)
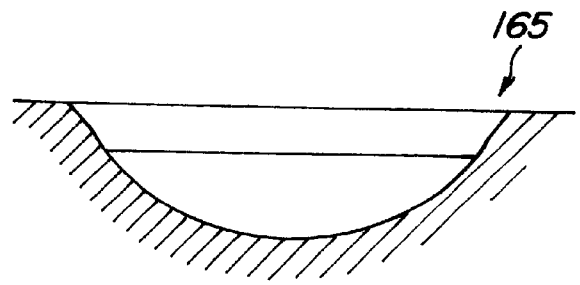

FIG_21
(a) (b)
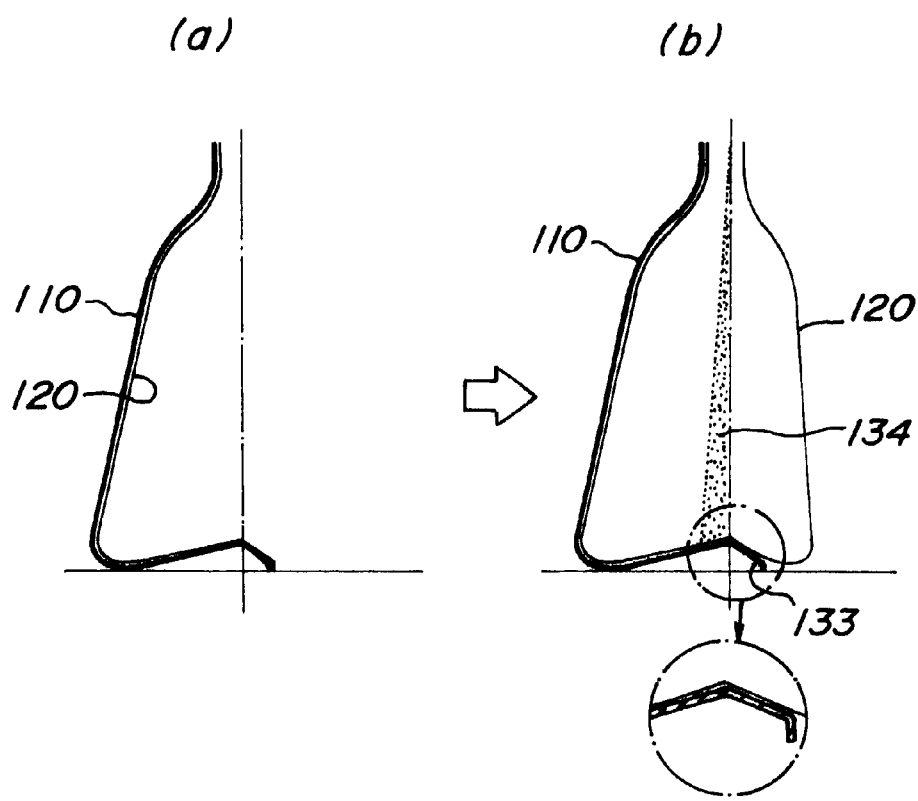
(c)
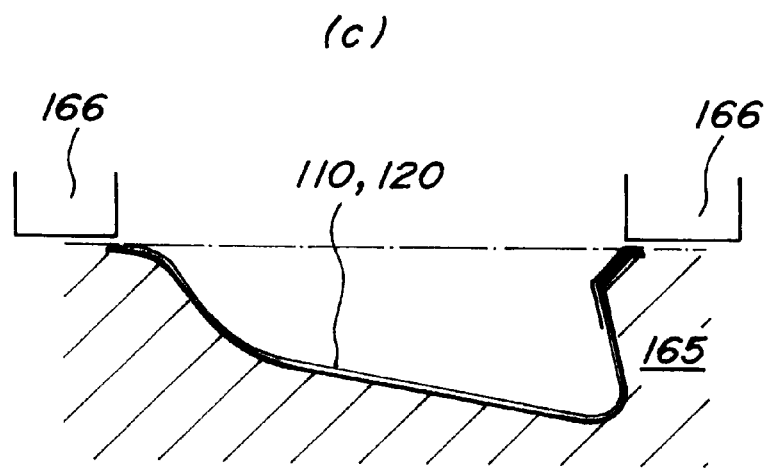

FIG. 23
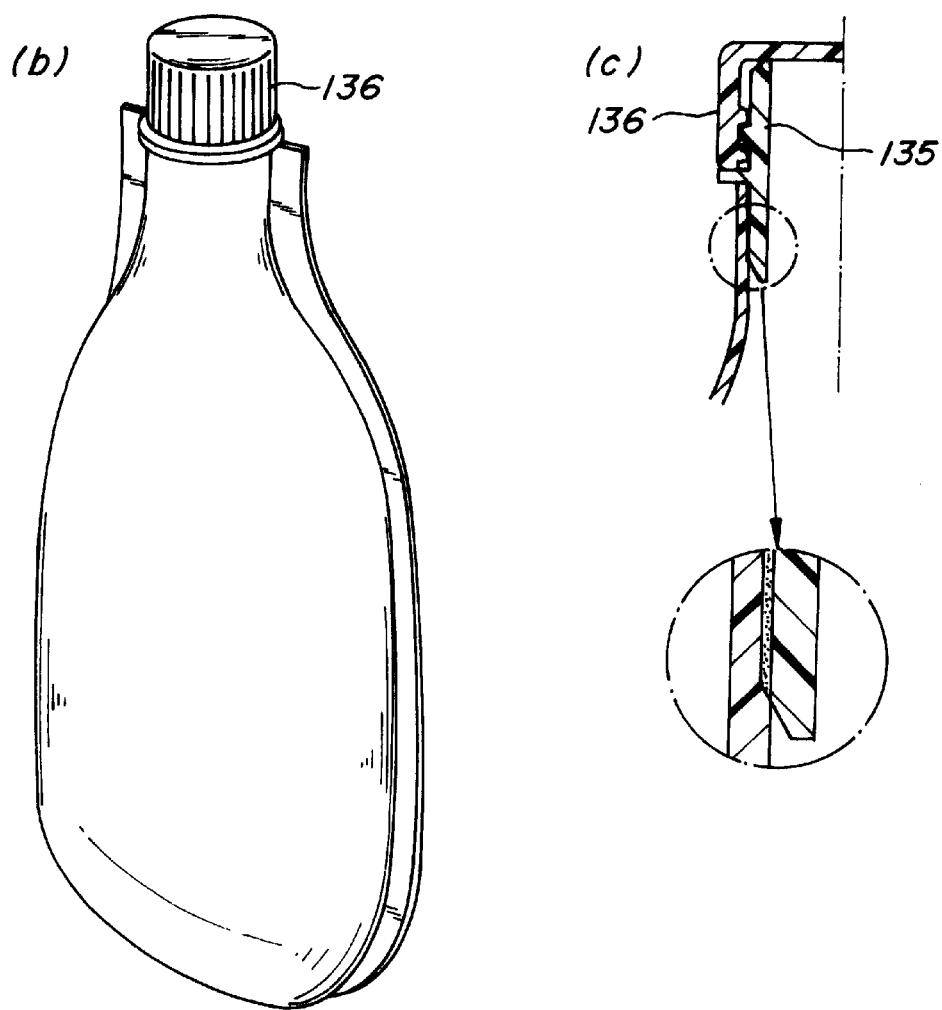
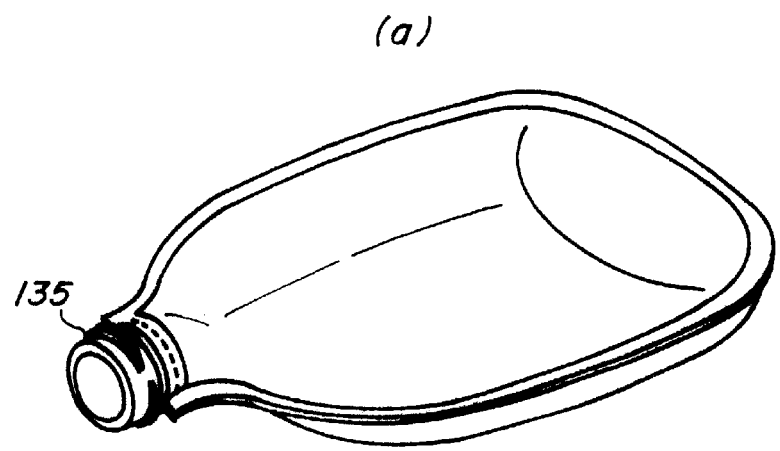

FIG. 24
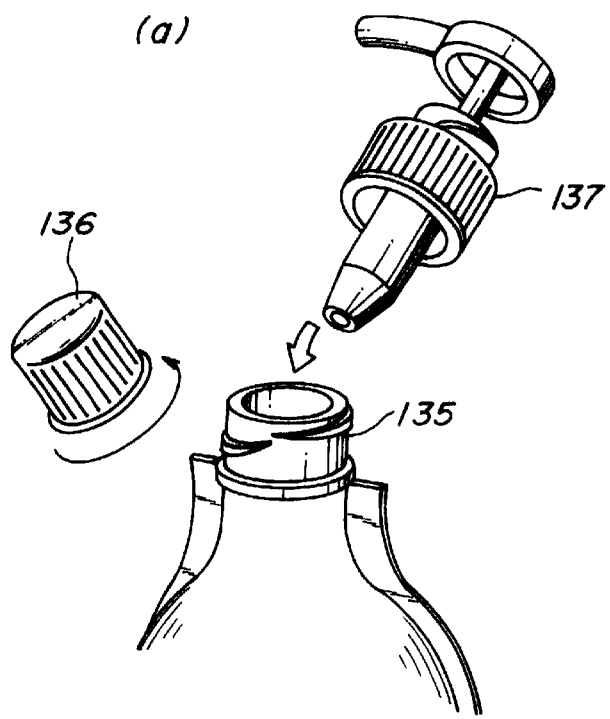
(a)
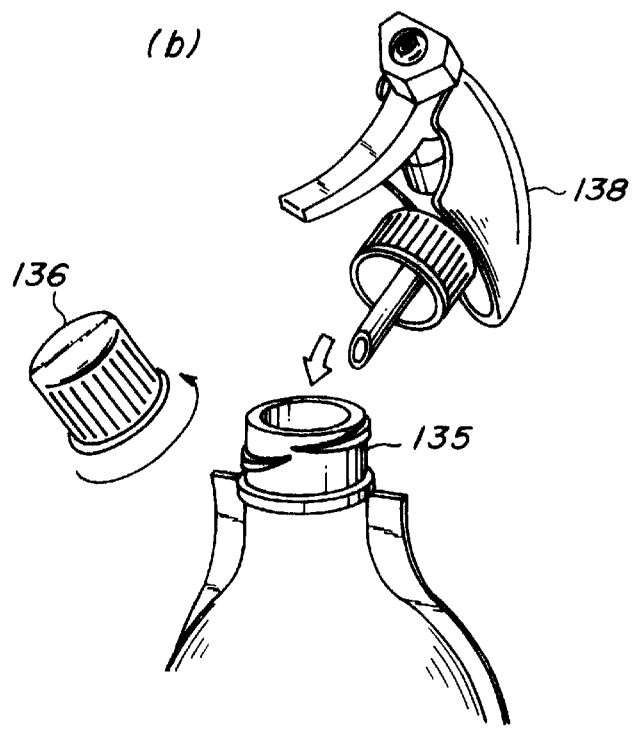
(b)

THIN-WALLED SYNTHETIC RESIN LAMINATED BODY FOR LIQUID CONTAINER AND METHOD FOR MANUFACTURING THE SAME

TECHNICAL FIELD

The present invention relates to a thin-walled synthetic resin laminated body for liquid containers, and also to a method for manufacturing the same.

BACKGROUND ART

In many instances, containers for liquid cosmetics, liquid detergent or the like have been formed of relatively thick-walled synthetic resin or glass, and discarded after consumption of the contents. Needless to say, it is desirable to reduce the amount of wastes to the extent possible, in view of waste disposal environment which is progressively severe in recent years. Under such circumstances, it became popular to accommodate the contents into a simple bag-shaped container and thereby reduce the weight and volume of wastes. This type of bag-shaped container is manufactured, for example, by bonding two sheets of plastic films to each other at the peripheral regions of their inner surfaces and tightly sealing them after charging a liquid into the interior space. In use, a corner portion of the bag-like container is cut away to open the storage portion which is then compressed so as to discharge the contents.

However, this type of bag-shaped container has a poor shape-stability in itself, and it is therefore difficult to stably hold the container with the contents filled therein, or to readily and positively adjust the discharge amount and discharge direction of the contents, besides that the shape of the container is basically limited to a relatively simplex planer shape. Therefore, it would be desirable to provide a liquid container which can be used in more facilitated manner, having a higher freedom degree of design, capable of being readily formed into a desired three-dimensional shape suitable for the required use, and capable of being manufactured in a simple and inexpensive manner.

DISCLOSURE OF THE INVENTION

It is therefore a primary object of the present invention to provide a synthetic resin thinly laminated body and a manufacturing method therefor, that are capable of forming a liquid container satisfying the aforementioned demand.

To achieve the above-mentioned object, the present invention provides a thin-walled laminated synthetic resin body for a liquid container, comprising first and second thin-walled synthetic resin layers, each having a curved surface portion and a projection, said projection extending outwardly from a predetermined region at an edge of said curved surface portion, wherein said first and second layers are laminated to each other with said curved surface portions bulging out in the same direction, said first and second layers are integrated with each other at the edges of said curved surface portions and at edges of said projections, and said first and second layers are separable from each other at those regions other than said edges of the curved surface portions and projections so that said curved surface portion of one of said first and second layers is separated from the curved surface portion of the other of said first and second layers and reversed when a liquid is charged, causing said curved surface portions to bulge out in the opposite directions, respectively, and thereby defining an inner space for containing a liquid between said curved surface portions.

The present invention also provides a method for manufacturing a thin-walled, laminated synthetic resin body for a liquid container, comprising the steps of mutually laminating first and second layers each made of a thin-walled synthetic resin sheet and having a curved surface portion and a projection, said projection extending outwardly from a predetermined region at an edge of said curved surface portion, with said curved surface portions bulging out in the same direction, and integrating said first and second layers with each other at said edges of the curved surface portions and at edges of said projections so that said first and second layers are separable from each other at those regions other than said edges of the curved surface portions and projections, and charging a liquid and reversing said curved surface portion of one of said first and second layers by separating it from the curved surface portion of the other of said first and second layers, causing said curved surface portions to bulge out in the opposite directions, respectively, and thereby obtaining a laminated body in which an inner space for containing is defined by a liquid between said curved surface portions.

According to the present invention, the thin-walled synthetic resin laminated body has a sufficient shape stability which is afforded by the curved surface portions, so that the laminated body can be stably held when used as a liquid container filled with the contents, thereby enabling simple and assured adjustment of the discharging amount and direction. Also, the shape of the curved surface portions can be readily formed into a desired three-dimensional configuration depending on the application, with improved freedom degree of design, without limited to a relatively simplex planer shape of the conventional. The synthetic resin laminated body having the above-mentioned unique structure can be manufactured readily and at a low cost, with a conventional manufacturing system.

In a preferred embodiment of the present invention, both of the first and second layers have flanges extending along the edges of the curved surface portions and the projections, respectively, and the first and second layers are fused to each other at the flanges. Alternatively, it is also possible to arrange an adhesive layer between the flanges along the edges of the curved surface portions and the projections, respectively.

In another preferred embodiment of the present invention, there is provided a separation layer on a region of the laminated surface side of one of the first and second layers, which is exclusive of the edges of the curved surface portion and projection of the one of the first and second layers.

In another preferred embodiment of the present invention, the first and second layers are formed of synthetic resin sheets made of the same material, and the synthetic resin sheets are laminated to each other under a predetermined temperature difference so as to afford a separability from each other. When the first and second layers are formed of synthetic resin sheets made of the same material, there may be further provided a separation sheet of a different material interposed between the first and second layers at a region excluding the edges of the curved surface portions and projections of the first and second layers.

In another preferred embodiment of the present invention, the first and second layers are formed of synthetic resin sheets made of materials which are different from each other so that the different materials exhibit a separability from each other in a laminated state of the first and second layers.

In another preferred embodiment of the present invention, the first and second layers are made of a single synthetic resin sheet, and connected to each other in a configuration folded at those edges of the curved surface portions, which are positioned at an opposite side to the projections so that the folded edges form a bottom of the container filled with a liquid.

In another preferred embodiment of the present invention, at least one of the first and second layers has a rigidity (or, so-called shape stability) which is sufficient for maintaining the shape of the container at least when it is filled with a liquid.

In another preferred embodiment of the present invention, the projections of the first and second layers are designed to allow formation of a discharge port of a hollow cylinder shape. In this case, it is preferred to provide breakable portions for opening the discharge port at the projections of the first and second layers.

In another preferred embodiment of the present invention, the projections of the first and second layers are formed as an end portion for fitting a cap and/or nozzle unit thereto.

BRIEF DESCRIPTION OF THE DRAWINGS

The present invention will be further described below with reference to the preferred embodiments shown in the accompanying drawings, in which:

FIGS. 5(a) to 5(f) are explanatory views showing the manner of using the laminated body according to the embodiment of FIG. 1, as a container;

FIG. 6 is a diagram showing one example of the process for manufacturing the laminated body according to the embodiment of FIG. 1;

FIG. 7 is a diagram showing another example of the process for manufacturing the laminated body;

FIG. 8 is a diagram showing still another example of the process for manufacturing the laminated body;

FIG. 9 is a longitudinal-sectional view similar to FIG. 3, showing a thin-walled synthetic resin laminated body according to another embodiment of the present invention;

FIG. 10 is a cross-sectional view of the projection taken along the line 9—9 in FIG. 10;

FIGS. 12(a) and 12(b) are explanatory views showing another preferred embodiment of the projection of the laminated body;

FIGS. 13(a), 13(b) and FIGS. 14(a), 14(b) are explanatory views showing a further embodiment of a container opening portion formed by a projection of the laminated body;

FIG. 15(a) to 15(c) are explanatory views showing a further improved embodiment of the container opening portion;

FIGS. 17(a) and 17(b) are explanatory views showing a modified form of the embodiment of FIG. 16(b);

FIG. 18 is an explanatory view showing another modified form of the embodiment of FIG. 16(b);

FIGS. 19(a) and 19(b) are explanatory views showing another configuration for improving the self-supporting stability of the container formed of the laminated body;

FIG. 20(a) is a perspective view of a mold for shaping a laminated body for the container of FIGS. 19(a) and 19(b);

FIGS. 20(b) and 20(c) are longitudinal-sectional view and cross-sectional view taken along the line L—L and line C—C in FIG. 20(a), respectively;

FIGS. 21(a) and 21(b) are explanatory views exemplifying another configuration for improving the self-supporting stability of the container formed of the laminated body;

FIG. 21(c) is an explanatory view showing a mold and a trimming tool for forming the laminated body of FIGS. 21(a) and 21(b);

FIGS. 23(a) to 23(c) are views showing another modified embodiment of the laminated body according to the present invention; and FIGS. 24(a) and 24(b) are explanatory views showing the laminated body according to the embodiment of FIGS. 23(a) to 23(c) when it is used as a container.

BEST MODE FOR CARRYING OUT THE INVENTION

Figure 1:
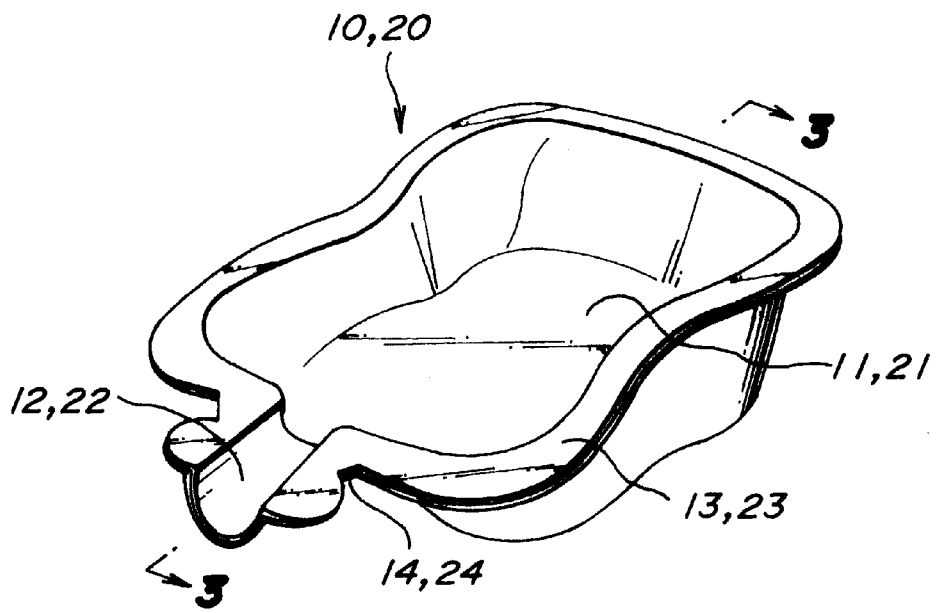
FIG. 1 is a perspective view of a thin-walled synthetic resin laminated body according to one embodiment of the present invention.
Figure 2:
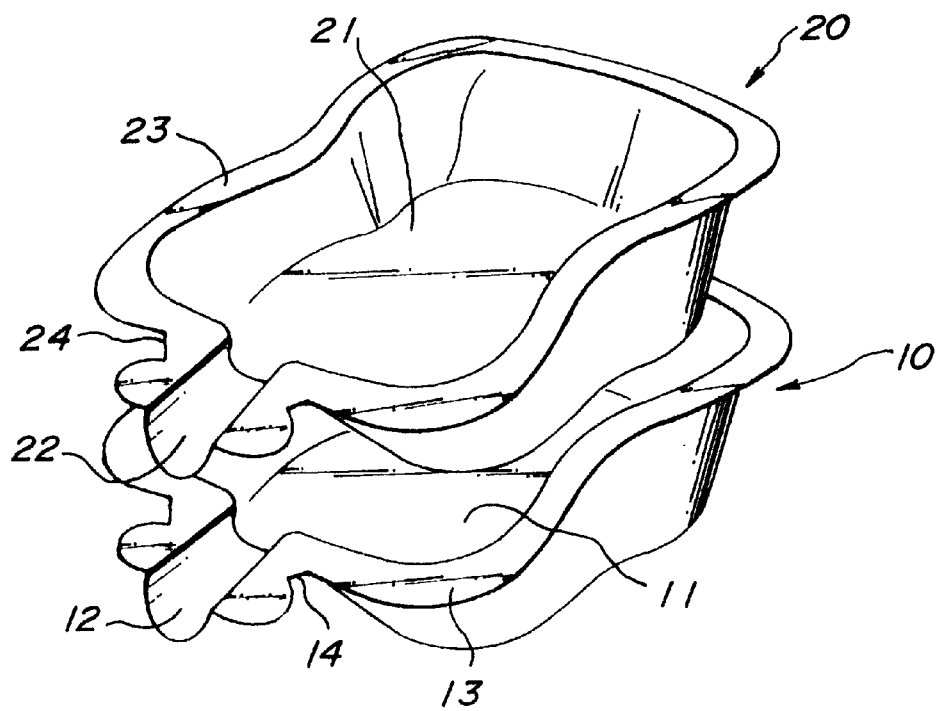
FIG. 2 is a perspective view, in conceptually exploded form, of the laminated body of FIG. 1.

Referring to FIGS. 1 through 4, there is shown one embodiment of the synthetic resin laminated body for a thin-walled liquid container according to the present invention, which is formed by mutually laminating first and second thin-walled synthetic resin sheets 10, 20 of substantially the same shape. The synthetic resin sheets 10, 20 have curved surface portions 11, 21 of dish-like shape, for example, projections 12, 22 of semi-cylindrical shape extending outwardly from the upper edges of the curved surface portions 11, 21, respectively, and edges 13, 23 in the form of outwardly directed flanges along the curved surface portions 11, 21 and the projections 12, 22. As seen from FIGS. 2 through 4, the synthetic resin sheets 10, 20 are laminated to each other in the manner to be described hereinafter, so that the curved surface portions 11, 21 protrude or bulge in the same direction. To facilitate the understandings, particularly in FIGS. 3 and 4, the thickness of the synthetic resin sheets 10, 20 are shown in an exaggerated manner. Furthermore, for the sake of convenience, the first and second synthetic resin sheets 10, 20 may be referred to as the outer layer and the inner layer, respectively. The curved surface portions 11, 21 of the synthetic resin sheets 10, 20 may be of any desired three-dimensional shape provided that the curved surface portion 21 of the inner layer 20 can be reversed in the manner to be described hereinafter, including a variety of shapes which, when projected onto a plane, is such as rectangular or elliptical. The curved surface portions 11, 21 may have substantially flat bottom areas, respectively.

In the illustrated embodiment, the flange-shaped edges 13, 23 extending along the semi-cylindrical projections 12, 22 of the synthetic resin sheets 10, 20 are formed with fragile and breakable portions 14, 24 having a reduced width, in the regions adjacent to the curved surface portions 11, 21, respectively. These breakable portions 14, 24 serve to break the projections 12, 22 in use condition as a liquid container, to thereby open a discharge port for the contents.

The synthetic resin sheets 10, 20 as the inner and outer layers are integrated to each other, for example by welding, at the edges 13, 23 along the curved surface portions 11, 21 and projections 12, 22, and are separable from each other at the curved surface portions 11, 21 and the projections 12, 22. In this way, at the time of charging or filling a liquid, the curved surface portion 21 of the inner layer 20 is reversed to project in a direction opposite to the curved surface portion 11 of the outer layer 10, while maintaining the integrity of the synthetic resin sheets 10 and 20 as a laminated body.

The wall thickness of the outer layer 10 can be suitably selected depending upon the type of synthetic resin to be used or the volume of the container, though the wall thickness is to be preferably made as thin as possible within a range where a sufficient rigidity can be obtained for maintaining a predetermined container shape at least when the container is filled with liquid. For example, when the outer layer 10 is formed of polyethylene (PE) resin, the thickness is preferably about 0.3 mm. The wall thickness of the inner layer 20 also can be suitably selected depending upon the type of synthetic resin to be used or the volume of the container, and this wall thickness may be thinner than that of the outer layer 10 when the outer layer 10 exhibits a sufficient rigidity by itself. The outer layer 10 and the inner layer 20 may be formed of the same or different materials, as required.

Figure 4:
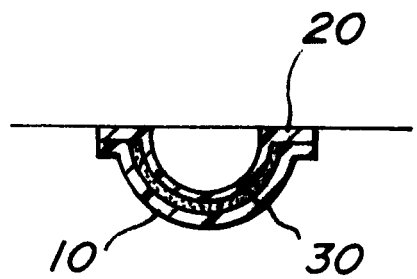
FIG. 4 is a cross-sectional view of the projection taken along the line 4—4 in FIG. 3.
Figure 3:
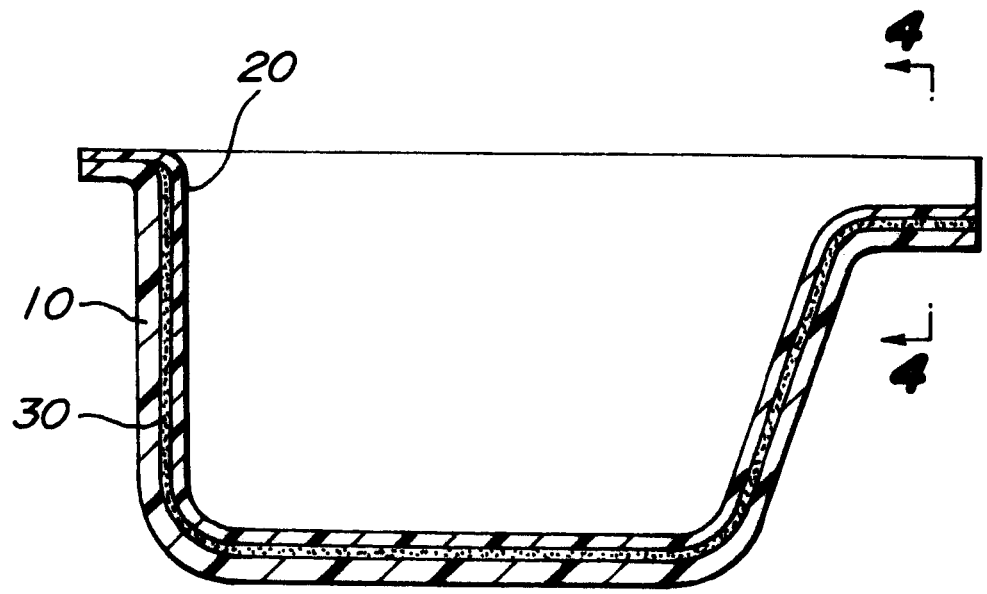
FIG. 3 is a longitudinal-sectional view of the laminated body taken along the line 3—3 in FIG. 1.

It is possible to adopt a variety of measures as a practical method for laminating the outer layer 10 and inner layer 20 so that they are separable from each other. For example, as shown in FIGS. 3 and 4, it is possible to interpose a separation layer 30 between the curved surface portions 11 and 21 and also between the projections 12 and 22, of the outer and inner layers 10, 20, respectively. This separation layer 30 is formed of a material having a separability to the outer layer 10 or inner layer 20, including synthetic resin such as polyethylene terephthalate (PET) resin. It is preferable that also the separation layer 30 has a thickness which is made as thin as possible within a range for exhibiting the desired separability, which is smaller than that of the outer layer 10.

The thin-walled laminated body according to the present invention having the aforementioned configuration is used in the following manner.

Namely, during transportation or storage of the laminated bodies when they are not yet used as containers, it is possible to stack a plurality of laminated bodies such that the respective curved surface portions 11, 21 are fitted to each other. In this way, it is possible to minimize the volume required for the entire laminated bodies during transportation or storage.

Further, in use of the laminated body as a liquid container, as shown in FIG. 5(a), for example, a negative pressure is applied via a suction pipe 40 onto the surface of the semi-cylindrical projection 23 of the inner layer 20, to thereby separate the projection 23 from the projection 13 of outer layer 10. Thereafter, an air nozzle 41 is inserted into the cylindrical tip end opening formed between the inner surfaces of the projections 12, 22, and air is then blown from the air nozzle 41 into the interior of the laminated body, so as to reverse the curved surface portion 21 of the inner layer 20 to bulge outwardly, i.e., in a direction away from the curved surface portion 11 of outer layer 10, thereby forming a container space for a liquid between the inner surfaces of curved surface portions 11, 21. In such a state, it is of course that the curved surface portion 21 of inner layer 20 is bulged in the direction opposite to the curved surface portion 11 of outer layer 10. A liquid container is thereby formed, into which a liquid is charged or filled from a liquid nozzle 42, as shown in FIG. 5(b). Subsequently, as shown in FIG. 5(c), the outer surfaces of projections 12, 22 are clamped between a pair of heated molds 43a, 43b and thereby fused to each other, while forming relatively fragile breakable portions 14, 24 having a reduced width, as shown in FIG. 5(d).

In discharging the liquid from the container filled with the liquid, a liquid discharge port is opened by breaking the projections 12, 22 at the breakable portions 14, 24, for example by a twisting force manually applied by user, as shown in FIG. 5(e). After consumption of the entire amount of the liquid in the container, the exhausted container is resumed to its original configuration in which the curved surface portion 21 of the inner layer 20 bulges in the same direction as the curved surface portion 11 of outer layer 10. Furthermore, the exhausted containers can be discarded in a plurally stacked manner as shown in FIG. 5(f), thereby minimizing the volume of the wastes.

There will be described below a process for manufacturing the thin-walled laminated body having the above-mentioned structure according to the present invention.

As shown in FIG. 6, at step 1, there is extruded a thin-walled synthetic resin sheet 51 from an extruder 50. The thin-walled synthetic resin sheet 51 is to form one of the outer and inner layers 10, 20. The thin-walled synthetic resin sheet 51 is applied with a corona treatment by means of a corona electrode 52, and then wound up onto a reel 53. The corona treatment, as a pretreatment step of the printing process to be described later, is performed for increasing the surface roughness of the synthetic resin sheet 51.

At step 2, the synthetic resin sheet 51 is unwound from the reel 53, and a desired decorative pattern 54 is printed such as by gravure printing onto the surface the roughness of which has been increased by the corona treatment. There is also printed or coated a separation ink as a separation material 55, onto the required area of the reverse surface of the synthetic resin sheet, i.e., onto those areas corresponding to the curved surface portion and projection of the laminated body, and the synthetic resin sheet 51 is wound up onto another reel 56.

At step 3, there is extruded another thin-walled synthetic resin sheet 58 from another extruder 57. The thin-walled synthetic resin sheet 58 is to form the other of the outer and inner layers 10, 20 of the laminated body. The synthetic resin sheet 58 extruded from the extruder 57 is laminated onto the synthetic resin sheet 51 which has been unwound from the reel 56, and under such a condition these laminated sheets are passed through heat-roll pairs 59a, 59b and 59b, 59c, to thereby conduct a so-called laminating thermal compression bonding. In this instance, the synthetic resin sheet 51 before passed through the heat-roll pairs is at a relatively low temperature, while the synthetic resin sheet 58 is at a relatively high temperature because it has been just extruded from the extruder 57. Thus, the synthetic resin sheets 51 and 58 are compression bonded with a temperature difference. In this instance, it is possible for the synthetic resin sheets 51, 58 to exhibit satisfactory separability from each other even when the synthetic resin sheets 51, 58 are made of the same material. Inherently, it is difficult to obtain satisfactory separability when the synthetic resin sheets 51 and 58 made of the same material at substantially the same temperatures are subjected to compression bonding to each other, since the sheets exhibit a tendency of tight adhesion to each other.

The laminated sheet 60 which has been obtained by the lamination thermal compression bonding is wound up onto a reel 61.

At step 4, the laminated sheet 60 is unwound from the reel 61 and also applied with a corona treatment as a pretreatment step of the printing process, and the laminated sheet 60 is then wound up onto a reel 62.

At step 5, the laminated sheet 60 is unwound from the reel 62 so that a desired pattern is printed onto the reverse side of the laminated sheet 60 which is then wound up onto a reel 63.

At the final step 6, the laminated sheet 60 is unwound from the reel 63 and heated to a predetermined temperature by a heater 64, and is then set onto a mold 65 so as to be shaped correspondingly to a concave shape of the mold 65. In this shaping process, it is possible to suitably adopt a known sheet shaping method such as pressurized air shaping method in which a positive pressure is applied onto the front surface side of the sheet, a vacuum shaping method in which a negative pressure is applied onto the back side of the sheet, or a vacuum/pressurized air shaping method combining these two methods. The laminated sheet 60 as shaped into the predetermined shape within the mold 65 is then subjected to trimming by a tool 66 so as to cut out the peripheral area of the laminated sheet 60 while leaving or reserving a flange-like edge along the curved surface portion and projection in the thin-walled synthetic resin laminated body.

In the so-obtained thin-walled synthetic resin laminated body 67 according to the present invention, two synthetic resin sheets 51 and 58 are thermally bonded to each other at the time of shaping, at areas other than those areas which have been printed or coated with the separation material. Furthermore, as described with reference to FIGS. 5(a) through 5(f), the inner layer of the thin-walled synthetic resin laminated body is reversed by blowing a gas, such as air, into the interior of the laminated body to thereby form a liquid container 68, and the container is then filled with a liquid and the opening at the projection is sealed to thereby provide a final product 69, i.e., the thin-walled container filled with the liquid.

There will be described below another embodiment of the manufacturing process of the thin-walled laminated body according to the present invention, with reference to FIG. 7. This embodiment is basically the same as that shown in FIG. 6, except for slight modifications.

At step 1 in the present embodiment, the thin-walled synthetic resin sheet 51 to form one of the outer and inner layers 10, 20 is extruded from the extruder 50. This thin-walled synthetic resin sheet 51 is subjected to the corona treatment and then wound up onto the reel 53. Furthermore, the thin-walled synthetic resin sheet 58 to form the other of the outer and inner layers 10, 20 is extruded from the extruder 57, applied with the corona treatment and then wound up onto a reel 80.

At step 2, the synthetic resin sheet 51 is unwound from the reel 53, and the desired decorative pattern 54 is printed, for example by gravure printing onto the surface the roughness of which has been increased by the corona treatment. Also, a separation ink is printed or coated as the separation material 55, onto those areas on the back side corresponding to the curved surface portion and projection of the laminated body, and the synthetic resin sheet is then wound up onto the reel 56. Further, as a process corresponding to the step 5 of FIG. 6, the synthetic resin sheet 58 is unwound from the reel 80 so that the front side applied with the corona treatment is printed with a desired decorative pattern 81, and the resin sheet 58 is then wound up onto a reel 82.

At step 3, the synthetic resin sheet 51 unwound from the reel 56 is laminated onto the synthetic resin sheet 58 which has been unwound from the reel 82, and the laminated sheets are entirely passed through the heat-roll pair 59a, 59b to thereby conduct a so-called dry-lamination type thermal compression bonding. In this instance, the synthetic resin sheets 51 and 58 before being passed through the heat-roll pair are substantially at the same temperature. Therefore, in order to exhibit a sufficient separability between the synthetic resin sheets 51, 58, it is preferred that the synthetic resin sheets 51 and 58 are made of different materials. The laminated sheet 60 obtained by the thermal compression bonding is wound up onto a reel 63.

At step 4, the laminated sheet 60 is unwound from the reel 63 and heated to a predetermined temperature by the heater 64, and is then set onto the mold 65 so as to be shaped correspondingly to the concaved shape of mold 65. The laminated sheet 60 as shaped is then subjected to trimming by the tool 66, so as to cut out the peripheral area of the laminated sheet 60 while leaving or reserving a flange-like edge along the curved surface portion and projection of the thin-walled synthetic resin laminated body. This step corresponds to the step 6 in FIG. 6.

There will be described below still another embodiment of the manufacturing process of the thin-walled laminated body according to the present invention, with reference to FIG. 8. This embodiment is basically the same as the process shown in FIG. 7, except for slight modifications.

The step 1 of the present embodiment is the same as the step 1 of FIG. 7, so that the explanation is omitted.

At step 2 of the present embodiment, the synthetic resin sheet 51 is unwound from the reel 53 and the desired decorative pattern 54 is printed onto the front surface which has been subjected to the corona treatment by gravure printing, for example, and the synthetic resin sheet 51 is then wound up onto the reel 56. However, the printing or coating of separation ink onto the back side is not conducted. Moreover, the synthetic resin sheet 58 is unwound from the reel 80 and the desired decorative pattern 81 is printed by gravure printing, for example, onto the front side which has been subjected to the corona treatment, and the synthetic resin sheet 58 is then wound up onto the reel 82.

At step 3, the synthetic resin sheet 51 unwound from the reel 56 and the synthetic resin sheet 58 unwound from the reel 82 are laminated with each other, while interposing therebetween a separation sheet 83 having a shape which corresponds to the product shape, and are then passed through the heat-roll pair 59a, 59b to thereby conduct a so-called dry-lamination-type thermal compression bonding. The laminated sheet 60 obtained by such thermal compression bonding is wound up onto the reel 63.

The separation sheet 83 may be comprised, for example, of polyethylene terephthalate resin, or ordinary or hydrated paper. In this case, the synthetic resin sheets 51, 58 may be made of the same or different materials, since the separation sheet 83 provides a sufficient separability between the synthetic resin sheets 51, 58. Thus, the freedom degree is increased in selecting the material for the synthetic resin sheets which are to form the outer and inner layers of the thin-walled synthetic resin laminated body.

The subsequent step 4 is substantially the same as the step 6 in FIG. 6 or step 4 in FIG. 7, so that the explanation is omitted.

When the thin-walled laminated body manufactured by the process in FIG. 8 is to be used, it is possible to remove the separation sheet 83 from the container as necessary, at the time of filling a liquid into the container after formation of the same by reversing the inner layer.

FIGS. 9 and 10 show another embodiment of the thin-walled synthetic resin laminated body according to the present invention. In the thin-walled synthetic resin laminated body according to the present embodiment, the synthetic resin sheets 10 and 20 serving as the outer and inner layers, respectively, are integrated with each other while interposing an adhesive layer 90 between the edges 13, 23 along the curved surface portions 11, 21 and projections 12, 22 of the sheets 10, 20, so that they are separable from each other at the curved surface portions 11, 21 and the projections 12. In this instance, also, the curved surface portion 21 of the inner layer 20 is adapted to be reversed to bulge in the direction opposite to the curved surface portion 11 of the outer layer 10 at the time of filling the liquid, while maintaining the integrity of the synthetic resin sheets 10 and 20 as the laminated body. In other aspects, the laminated body according to the present embodiment has a structure which is basically the same as that shown in FIGS. 1 through 4.

It will be appreciated from the foregoing description that the thin-walled synthetic resin laminated body according to the present invention has a sufficient shape stability which is afforded by the curved surface portions, so that the laminated body can be stably held when used as a liquid container filled with the contents, thereby enabling simple and assured adjustment of the discharging amount and direction. Also, the shape of the curved surface portions can be readily formed into a desired three-dimensional configuration depending on the application, with improved freedom degree of design, without limited to a relatively simplex planer shape of the conventional. The synthetic resin laminated body having the above-mentioned unique structure can be manufactured readily and at a low cost, with a conventional manufacturing system.

The present invention is not limited to the basic embodiments described above, and it is needless to say that a variety of developments may be made without departing from the scope thereof. Some of such embodiments will be explained below, by way of examples.

Figure 11:
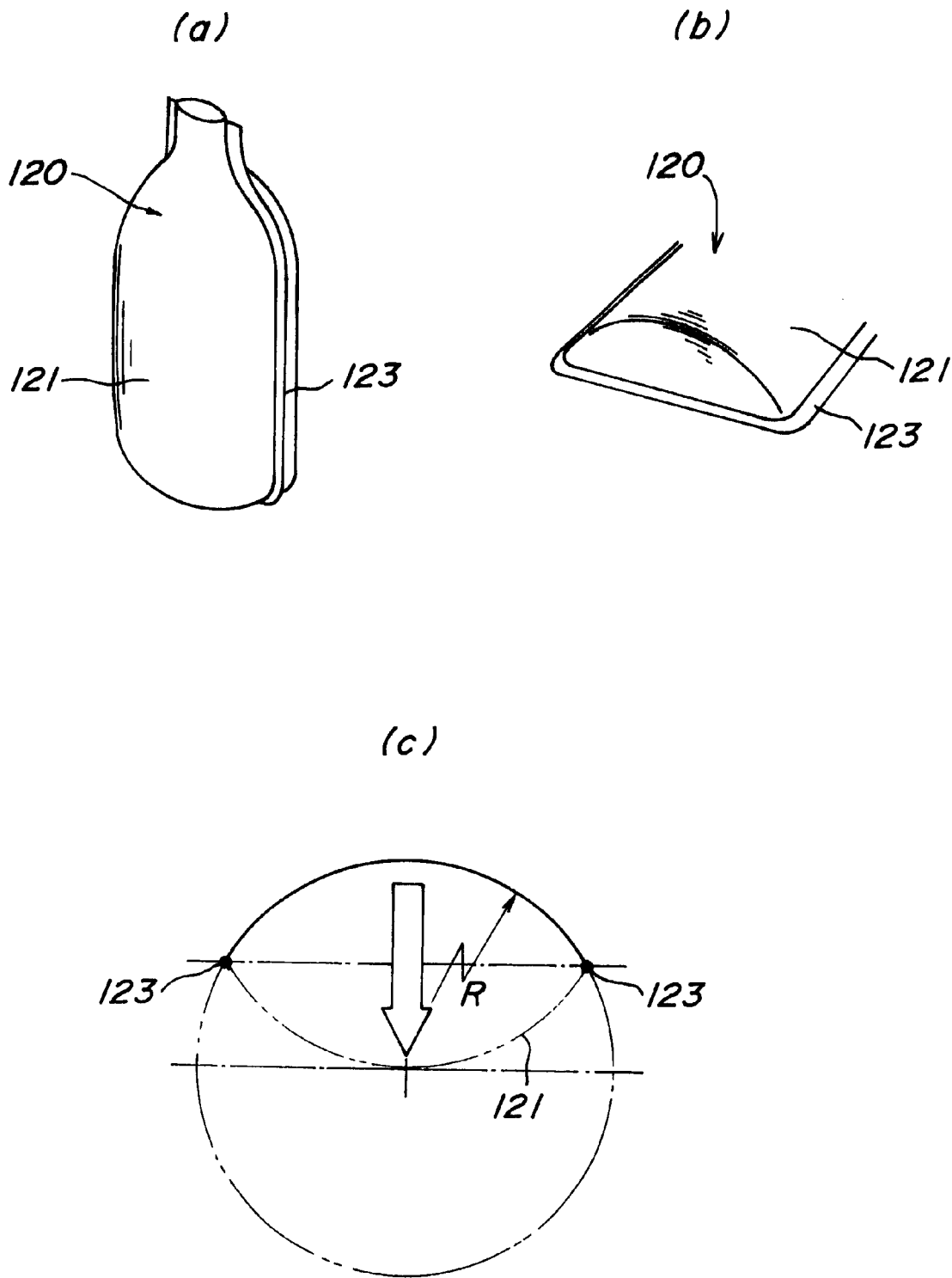
FIGS. 11(a) to 11(c) are explanatory views showing a preferred embodiment of the curved surface portion of the laminated body.

In the thin-walled synthetic resin laminated body according to the present invention, it is important that the curved surface portion of the inner layer is can be positively reversed, in using the laminated body as a container filled with a liquid. To this end, as shown in FIGS. 11(*a*) through 11(*c*), it is preferred that at least the cross-section of curved surface portion 121 of the inner layer 120 in the laminated body has an arcuate shape of a uniform radius of curvature R between both side edges 123 extending in the longitudinal direction. When the curved surface portion 121 of the inner layer 120 has an angled or cornered portion, for example, as at the joining area to the side edges 123 or at the intermediate area between the side edges 123, a local stress concentration tends to be caused at the time of reversing the curved surface portion 121, thereby making it difficult to achieve the reversing operation and lowering the impact resistance at the areas where the stress has been caused. Furthermore, when the radius of curvature changes, for example, at the joining area between the curved surface portion 121 and the side edges 123 or at the intermediate area of the curved surface portion 121, it is possible to avoid occurrence of stress concentration though it becomes difficult to stably maintain the reversed shape of the curved surface portion 121, since there exists a small upstanding of the radius of curvature particularly at the joining area to the side edges 123, and the curved surface portion 121 during the reversing deformation exhibits a tendency of restoring deformation to resume to its initial shape. These problems can be eliminated collectively, by designing the cross-section of the curved surface portion 121 to have an arcuate shape of a uniform radius of curvature R.

Similarly, one may expect that the reversing characteristic of projection 122 of the inner layer 120 is also improved when the cross-sectional shape of the projection 122 is arcuate having a uniform radius of curvature between the side edges 123 extending in the longitudinal direction. However, it has been verified that no particular improvements could be recognized, due to the reversing area which is small. It has also been confirmed that, at the time of discharging the contents from the container, the opening portion may be left opened depending upon the discharge amount of the liquid. It is therefore preferred that the projection 122 of the inner layer 120 can be maintained substantially in tight contact with the outer layer 110 even when the curved surface portion 121 is reversed, as shown in FIGS. 12(*a*) and 12(*b*), from the viewpoint of preventing leakage of the contents when the container lies overturned, or preventing oxidation of the contents. In FIGS. 12(*a*) and 12(*b*), the arrows designate a cutting portion of the projection 122 and the imaginary line designates a crest line of the projection 122 in the longitudinal direction of the container.

FIGS. 13(*a*), 13(*b*) and FIGS. 14(*a*), 14(*b*) show one embodiment of the container opening portion based on the above-mentioned concept, wherein the projections of the outer layer 110 and inner layer 120 are formed with a container opening portion 130*a* and a container charging portion 130*b* which are independent from each other. As shown in FIGS. 13(*a*), 13(*b*), the outer layer 110 and the inner layer 120 are normally in close contact with each other at the projection, so as to close the container opening portion 130*a*. It is therefore possible to avoid leakage or oxidation of the contents even when the container lies overturned. Also, by compressing the curved surface portions and increasing the inner pressure of the container, as shown in FIGS. 14(*a*) and 14(*b*), the container opening portion 130*a* is opened by the inner pressure to discharge the contents.

FIGS. 15(*a*) through 15(*c*) show an embodiment which is further developed from the above-mentioned embodiment so as to more positively prevent leakage or oxidation of the contents from the container lying overturned. In the present embodiment, at the projections 112, 122 forming the opening portion of the container, the outer and inner layers 110, 120 are provided with ridges 115, 125 having an arcuate cross-section. These ridges 115, 125 extend in a direction perpendicular to the discharge direction of the contents at the container opening portion, such that the ridges 115, 125 are normally in tight contact with each other as shown in FIG. 15(*b*), to thereby prevent leakage or oxidation of the contents with the container lying overturned. When the curved surface portions are compressed to increase the inner pressure of container, the ridges are separated from each other to thereby open the container opening portion as shown in FIG. 15(*c*).

It is also important for the thin-walled synthetic resin laminated body according to the present invention to exhibit an improved self-supporting stability when it is used as a container filled with a liquid. To this end, it is desirable to suitably select the thickness of the synthetic resin sheet for the outer and inner layers of the laminated body. When the synthetic resin sheet for the inner layer is excessively thin attaching greater importance to the reversibility, there is an enhanced tendency that the container tilts down in the direction of the inner layer of the container which is filled with the liquid. When both the synthetic resin sheets for outer and inner layers have extremely small thickness (e.g., less than 0.3 mm), there is caused a tendency that the flange-like edge 133 tilts down toward the outer layer side of the container due to the tension from the inner layer side. As a result, the above-mentioned tilting tendency of the container toward the inner layer side is cancelled and the container is supported by the entire bottom surface under the weight of the contents. Still, however, the instability of the container cannot be solved due to an insufficient rigidity of the container as a whole.

Figure 16:
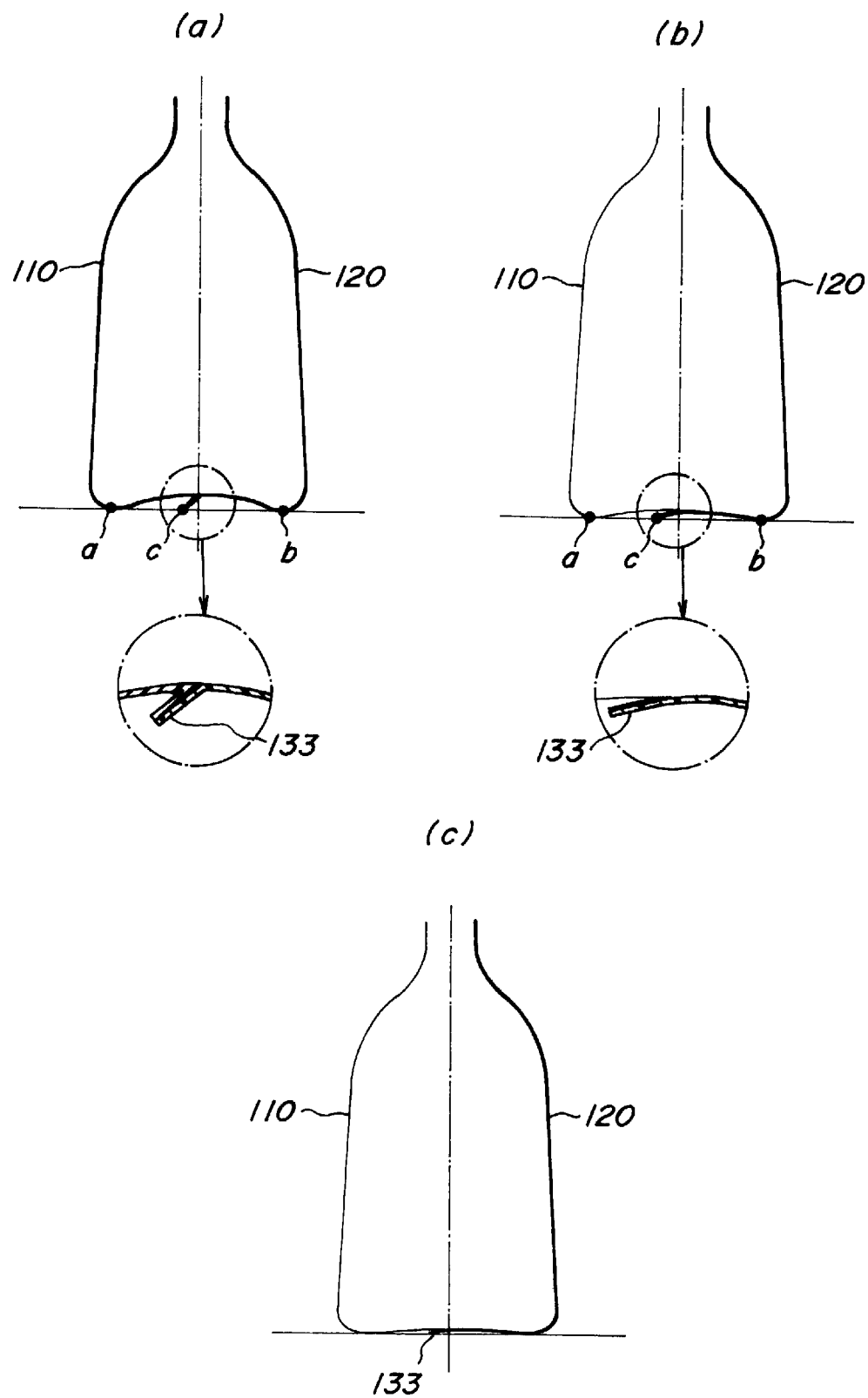
FIGS. 16(a) to 16(c) are explanatory views exemplifying a configuration for improving the self-supporting stability of the container formed of the laminated body.

From these viewpoints, as shown in FIG. 16(a), when the thickness of synthetic resin sheets of the outer and inner layers 110, 120 is slightly increased (e.g., to about 0.5 mm), there can be obtained a sufficient rigidity of the container as a whole and the container can be stably supported by the lowermost points a, b of the inner and outer layers 110, 120, respectively, and the peripheral tip point c of the flange-like edge 133. Also, as shown in FIG. 16(b), when the thickness of the synthetic resin sheet for the outer layer 110 is about 0.3 mm and only the thickness of the synthetic resin sheet for the inner layer 120 is slightly increased (e.g., to about 0.5 mm), there is a tendency that the flange-like edge 133 tilts down in the direction toward the outer layer 110 thereby making it possible to improve that the self-supporting stability of the container. In the arrangement of FIG. 16(b), when the bottom shape of the container is further flattened as shown in FIG. 16(c), the container can be supported by substantially the entire bottom surface of the container, thereby making it possible to further improve the self-supporting stability of the container.

Moreover, in the arrangement of FIG. 16(b), it is also possible to improve the self-supporting stability of the container when the edge 133, which tends to tilt down at the bottom of the container toward the outer layer 110 when reversing the inner layer 120, is extended as shown in FIGS. 17(a), 17(b), so that the container is supported exclusively by the lowermost point of the inner layer 120 and the peripheral tip point of the flange-like edge 133.

Conversely to the above-mentioned arrangements, when the thickness of the synthetic resin sheet of the outer layer 110 is slightly increased (e.g., to about 0.5 mm) and the thickness of the synthetic resin sheet of the inner layer 120 is about 0.3 mm, the edge 133 exhibits a tendency to tilt down toward the inner layer 120 when reversing the inner layer 120, so as to improve the stability of the container.

FIGS. 19(a), 19(b) show one embodiment in which the distance L1 between the lowermost point of the outer layer 110 and the peripheral tip point of the flange-like edge 133 is made larger than the distance L2 between the lowermost point of the inner layer 120 and the peripheral tip point of the flange-like edge 133, in the arrangement wherein the thickness of the synthetic resin sheet for the outer layer 110 is slightly increased (e.g., to about 0.5 mm) and the thickness of the synthetic resin sheet of inner layer 120 is about 0.3 mm, in the similar manner to the above-mentioned embodiment. With such an arrangement, the weight component of the contents to be supported by the side of the outer layer 110 and the weight component to be supported by the side of the inner layer 120 can be suitably distributed depending upon the respective rigidity of the layers. Since the outer layer 110 formed of a slightly thicker synthetic resin sheet has a relatively high rigidity, it is possible to stably support the container. FIG. 20(a) through 20(c) show a mold 165 for shaping the laminated body having the above-mentioned flange-like edge 133.

FIGS. 21(a) and 21(b) show another embodiment in which the thickness of the synthetic resin sheet for the outer layer 110 is slightly increased (e.g., to about 0.5 mm) and the thickness of the synthetic resin sheet for the inner layer 120 is about 0.3 mm, similarly to the embodiment of FIGS. 19(a), 19(b), and in which the neighboring regions 134 of the joining portions of the outer and inner layers 110, 120 are not applied with a separation material. Since the outer and inner layers 110, 120 are maintained in tight contact with each other in the use condition as a container, in the regions which are free from the separation material, the present invention also makes it possible to suitably distribute the weight component of the contents to be supported by the side of the outer layer 110 and the weight component to be supported by the side of the inner layer 120, depending upon the respective rigidities of the layers. The outer layer 110 formed of a slightly thicker synthetic resin sheet has a relatively high rigidity, and it is thus possible to stably support the container. FIG. 21(c) shows the mold 165 and the trimming tool 166 for shaping the laminated body of the present embodiment.

Figure 22:
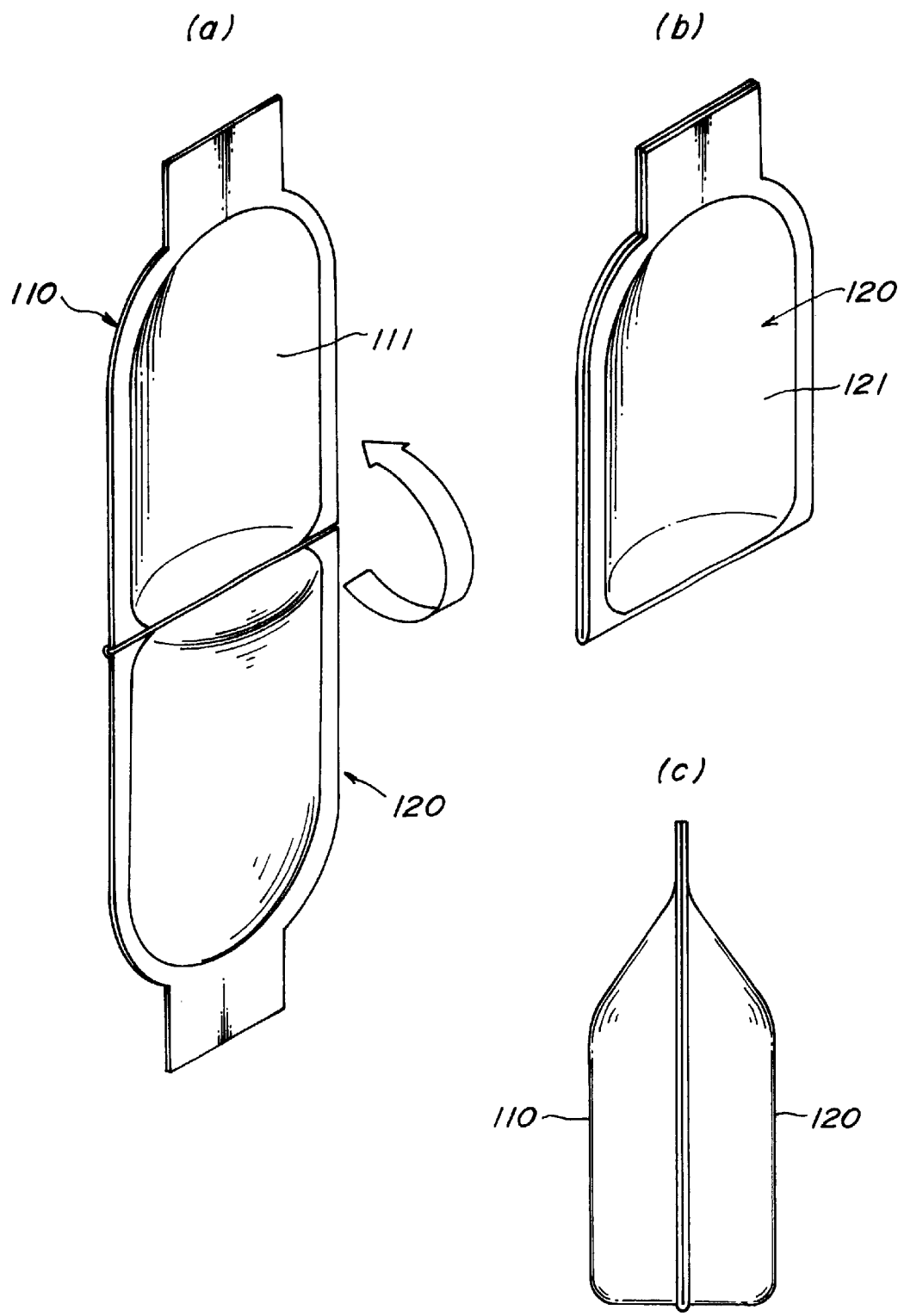
FIGS. 22(a) to 22(c) are explanatory views showing an embodiment of the laminated body in which the inner and outer layers are constituted of a single synthetic resin sheet.

FIGS. 22(a) through 22(c) show another embodiment in which the outer and inner layers 110, 120 are made of a single synthetic resin sheet, and are connected to each other in a configuration folded at those edges of the curved surface portions 111, 121 which correspond to the container bottom. In this instance, the folded edges of the outer and inner layers 110, 120 form the bottom of the container filled with the liquid, and the bottom has a flat shape without any flanges, to thereby further improve the stability of the container.

FIGS. 23(a) through 23(c) show a modified embodiment of the laminated body according to the present invention. In this embodiment, a threaded portion 135 is fixedly provided at a projection of the laminated body, by heat welding or ultrasonic bonding. A cap 136 can be engaged with the threaded portion 135, when the laminated body is used as a container. As shown in FIGS. 24(a), 24(b), the cap 136 may be disengaged from the threaded portion 135, and the threaded portion 135 may be fitted with a dispenser nozzle unit 137 or 138 of a desired configuration, to thereby enhance the practical utility of the container. In the laminated body of the present embodiment, the flange-like edges on both sides of the projections, that are provided with the threaded portion 135, may be enlarged and formed with an aperture to be passed by a suspension fitting of a showcase for displaying goods.

The present invention may of course be carried out in a variety of modes other than those described above.

What is claimed is:

1. A thin-walled laminated synthetic resin body for a liquid container, comprising first and second thin-walled synthetic resin layers, each having a curved surface portion and a projection, said projection extending outwardly from a predetermined region at an edge of said curved surface portion, wherein first and second layers are laminated to each other with said curved surface portions bulging out in a same direction, said first and second layers are integrated with each other at the edges of said curved surface portions and at edges of said projections, and said first and second layers are separable from each other at regions exclusive of said edges of the curved surface portions and projections so that said curved surface portion of one of said first and second layers is separated from the curved surface portion of the other of said first and second layers and reversed when a liquid is charged, causing said curved surface portions to bulge out in the opposite directions, respectively, and thereby defining an inner space for containing a liquid between said curved surface portions, wherein said first and second layers are made of a single synthetic resin sheet, and connected to each other in a configuration folded at an edge region of said curved surface portions which is positioned at a side opposite to said projections, said folded edge region forming a bottom of a container when filled with a liquid.

2. The laminated body according to claim 1, wherein both of said first and second layers have flanges extending along the edges of said curved surface portions and said projections, respectively, and said first and second layers are fused to each other at said flanges.

3. The laminated body according to claim 1, wherein both of said first and second layers have flanges extending along the edges of said curved surface portions and said projections, respectively, and an adhesive layer is arranged between said flanges.

4. The laminated body according to claim 1, wherein a separation layer is provided on a region of a laminated surface side of one of said first and second layers, said region excluding the edges of said curved surface portion and projection of said one of said first and second layers.

5. The laminated body according to claim 1, wherein said first and second layers are formed of synthetic resin sheets which are made of the same material and laminated to each other under a predetermined temperature difference so as to afford a separability from each other.

6. The laminated body according to claim 1, wherein said first and second layers are formed of synthetic resin sheets made of the same material, and a separation sheet of a different material is interposed between said first and second layers at a region excluding the edges of said curved surface portions and projections of said first and second layers.

7. The laminated body according to claim 1, wherein at least one of said first and second layers has a rigidity sufficient for maintaining a shape of the container at least when it is filled with a liquid.

8. The laminated body according to claim 1, wherein said projections of said first and second layers allow formation of a discharge port having a hollow cylindrical shape.

9. The laminated body according to claim 8, wherein said first and second layers have breakable portions for opening a discharge port at said projections of said first and second layers.

10. The laminated body according to claim 1, wherein said projections of said first and second layers are formed as an end portion for fitting a cap and/or nozzle unit thereto.

11. A method for manufacturing a thin-walled, laminated synthetic resin body for a liquid container, comprising the steps of mutually laminating first and second layers each made of a thin-walled synthetic resin sheet and having a curved surface portion and a projection, said projection extending outwardly from a predetermined region at an edge of said curved surface portion, with said curved surface portions bulging out in a same direction, and integrating said first and second layers with each other at said edges of the curved surface portions and at edges of said projections so that said first and second layers are separable from each other at those regions other than said edges of the curved surface portions and projections, and charging a liquid and reversing said curved surface portion of one of said first and second layers by separating it from the curved surface portion of the other of said first and second layers causing said curved surface portions to bulge out in opposite directions, respectively, and thereby obtaining a laminated body in which an inner space for containing is defined by a liquid between said curved surface portions, wherein said first and second layers are formed from a single synthetic resin sheet which is folded at those edges of the curved surface portions, which are positioned at a side opposite to said projections.

12. The method according to claim 11, wherein said first and second layers are fused to each other at flanges extending along said edges of the curved surface portions and projections, respectively, of said first and second layers.

13. The method according to claim 11, wherein said first and second layers are bonded to each other at flanges extending along said edges of said curved surface portions and projections, respectively, of said first and second layers.

14. The method according to claim 11, wherein a separation layer is applied over an area at a laminated surface side of one of said first and second layers, said area excluding said edges of the curved surface portion and projection of said one of said first and second layers.

15. The method according to claim 11, wherein said first and second layers are formed of synthetic resin sheets made of the same material and a separation sheet of a different material is interposed between said first and second layers at a zone excluding said edges of the curved surface portions and projections of said first and second layers.

16. The method according to claim 11, wherein said first and second layers are formed of synthetic resin sheets made of the same material, and said synthetic resin sheets are laminated to each other under a predetermined temperature difference so as to afford a desired separability.

17. The method according to claim 11, wherein a breakable portion is formed at said projections of the first and second layers, said breakable portion being adapted to open a discharge port having a hollow cylindrical shape.

* * * * *

UNITED STATES PATENT AND TRADEMARK OFFICE
CERTIFICATE OF CORRECTION

PATENT NO.   : 6,586,060 B2
DATED        : July 1, 2003
INVENTOR(S)  : Sadatoshi Kose et al.

It is certified that error appears in the above-identified patent and that said Letters Patent is hereby corrected as shown below:

<u>Column 14,</u>
Line 14, after the word "containing", insert -- the liquid, -- and after the word "defined" delete "by a"; and
Line 15, delete "liquid".

Signed and Sealed this

Twenty-fifth Day of November, 2003

JAMES E. ROGAN
*Director of the United States Patent and Trademark Office*